(No Model.)
C. B. BAGLEY.
AXLE NUT.
No. 536,994.   Patented Apr. 9, 1895.
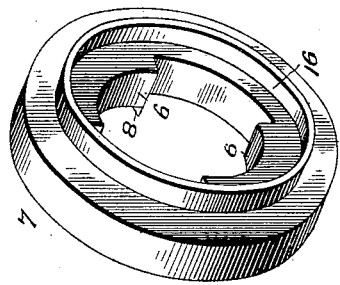
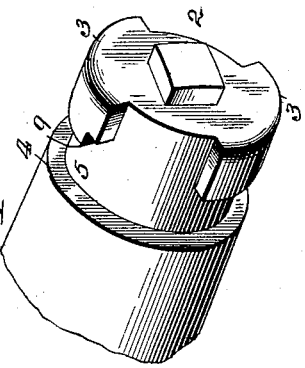
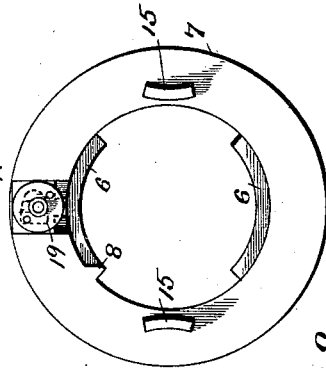
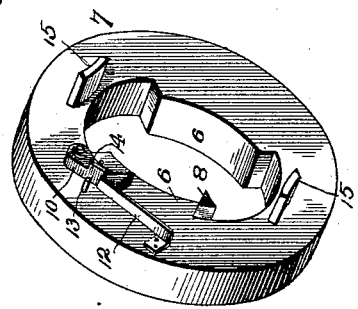
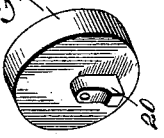
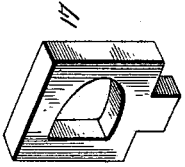
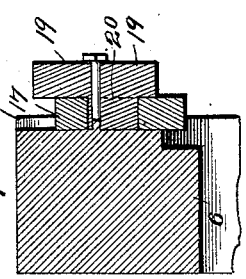
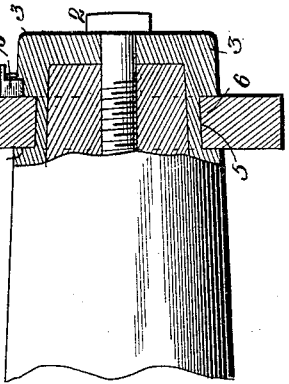
Witnesses
Jos. C. Stack
H. T. Riley
Inventor
Charles B. Bagley
By his Attorneys.
C. A. Snow & Co.
THE NORRIS PETERS CO., PHOTO-LITHO., WASHINGTON, D. C.

UNITED STATES PATENT OFFICE.

CHARLES BOYLES BAGLEY, OF FAYETTEVILLE, TENNESSEE.

AXLE-NUT.

SPECIFICATION forming part of Letters Patent No. 536,994, dated April 9, 1895.

Application filed September 29, 1894. Serial No. 524,492. (No model.)

*To all whom it may concern:*

Be it known that I, CHARLES BOYLES BAGLEY, a citizen of the United States, residing at Fayetteville, in the county of Lincoln and State of Tennessee, have invented a new and useful Axle-Nut, of which the following is a specification.

The invention relates to improvements in axle nuts.

The object of the present invention is to dispense with the ordinary threaded axle nut and to provide a simple and inexpensive device which may be readily placed on and removed from a spindle, and which cannot become accidentally lost.

A further object of the invention is to provide such a device which will be readily applicable to axle skeins or solid spindles of various kinds of vehicles, and which will not require a wrench or similar tool for placing it on or removing it from a spindle.

The invention consists in the construction and novel combination and arrangement of parts hereinafter fully described, illustrated in the accompanying drawings, and pointed out in the claims hereto appended.

In the drawings: Figure 1 is a perspective of a portion of a spindle provided with an axle nut or device constructed in accordance with this invention. Fig. 2 is a longitudinal sectional view of the same. Fig. 3 is a detail perspective view of the skin or spindle. Fig. 4 is a similar view of the ring or nut. Fig. 5 is a similar view showing the inner side of a nut adapted for carriage spindles and provided with a washer-receiving recess. Fig. 6 is a plan view of an axle nut or ring illustrating a modification of the catch. Fig. 7 is a sectional view of the catch shown in Fig. 6. Figs. 8 and 9 are detail views of the parts of the catch.

Like numerals of reference indicate like parts in all the figures of the drawings.

1 designates an axle skein or spindle, having a reduced outer portion 2, and provided at diametrically-opposite points, at the outer end thereof, with curved lugs or enlargements 3, which form, with the shoulder 4 of the inner portion of the spindle, an annular groove 5, adapted to receive curved lugs or enlargements 6, located on the interior of a locking ring or nut 7, designed to perform the function of an ordinary axle nut. The curved lugs or enlargements 6, on the interior of the locking-ring 7, are of a size to fit between the lugs or enlargements 3 on the exterior of the reduced portion 2 of the spindle, to enable the ring to be placed on the reduced portion 2 and moved inward to carry its lugs or enlargements 6 into the annular groove 5, after which the ring is rotated partially to carry its lugs in rear of those of the skein or spindle, whereby the locking-ring will be secured against outward movement on the reduced portion 2.

The partial rotation of the locking-ring is limited by an outward-projecting stop 8, located at one end of one of the lugs 6, and received into a recess 9 of the adjacent lug 3 of the spindle or skein, when the locking ring has completed its partial rotation.

The locking-ring is provided with a pivoted spring-actuated catch 10, located on its outer face and provided at its free end with an engaging tooth adapted to interlock with a shouldered notch 11, of the enlargement 3 of the skein or spindle. A spring 12, secured at one end to the locking-ring, has its free end bearing against the outer edge of the pivoted pawl, to force the latter inward; and the pivotal movement of the pawl is limited by projections 13 at opposite sides of the said pawl. The pawl is provided at its outer face with a projecting flange 14, by which it may be readily lifted out of engagement with the shouldered notch 11. Each lug 3 of the skein or spindle is designed to be provided with a shouldered notch, and with a recess 9 to enable the locking-ring to be readily applied with its catch either up or down; but it is preferable to locate the catch at the top.

The locking-ring is provided at diametrically-opposite points with outward-extending, slightly curved projections or flanges 15, adapted to be engaged by the thumb and finger to facilitate the placing of the locking-ring on the spindle. These projections or flanges 15 are formed integral with the locking-ring, and the pivot of the catch and rivets of the spring are preferably integral, and is designed to be provided with a separate head, which is secured in place by riveting, or the like, after the parts have been assembled, and a washer may be interposed between the head and catch. The projections 13 are also integral with the locking-ring.

The locking-ring may be applied to all kinds of spindles and axle skeins, and in their application to buggies they may have a cap or extension for closing the outer end of the hub, and, as illustrated in Fig. 5, they may be provided with a recess 16 for the reception of a washer.

In Figs. 6 to 9 inclusive is illustrated a modification of the catch, which consists of a sliding locking-plate 17, arranged in a recess 18 at the outer face of the ring and provided with a transversely-enlarged opening, and a rotary disk 19 centrally pivoted and provided with an eccentric 20 arranged in the opening of the locking plate and adapted to actuate the latter. The locking-plate is provided at its inner end with a lug for engaging a rectangular recess of the spindle or skein; and the disk is designed to be provided with opposite sockets to receive a key for operating the catch.

It will be seen that the locking-ring is simple and comparatively inexpensive in construction, that it is applicable to all classes of spindles and skeins, and that it is securely locked in position and is prevented from accidentally leaving a spindle or skein.

Changes in the form, proportion, and the minor details of construction may be resorted to without departing from the principle or sacrificing any of the advantages of this invention, such as adapting the improvement to all kinds of spindles and skeins, and arranging the locking-ring for rotation in either direction in the operation of locking.

What I claim is—

1. The combination of a skein or spindle having a reduced outer portion and provided with exterior lugs, a locking-ring adapted to be placed on the reduced portion of the spindle and provided with interior lugs of a size to pass between those of the skein or spindle, finger projections disposed exteriorly on the locking-ring, and a spring-actuated catch mounted on the locking-ring and engaging one of the exterior lugs, substantially as described.

2. The combination of a skein or spindle provided with an outer reduced portion and having exterior lugs, one of said lugs being provided at one end with a recess, a locking-ring arranged on the reduced portion of the spindle and provided with interior lugs, a projection extending from the locking-ring and forming a stop and fitting in the said recess and limiting the rotation of the locking-ring, and a catch mounted on the locking-ring and engaging the spindle or skein, substantially as and for the purpose described.

In testimony that I claim the foregoing as my own I have hereto affixed my signature in the presence of two witnesses.

CHARLES BOYLES BAGLEY.

Witnesses:
ROBT. L. DAVIDSON,
R. ED. FEENEY.